United States Patent
MacNeill et al.

(10) Patent No.: US 8,462,583 B2
(45) Date of Patent: Jun. 11, 2013

(54) METHOD OF MARINE SEISMIC DATA ACQUISITION

(75) Inventors: Malcolm David MacNeill, Perth (AU); Joe Frank McNutt, Perth (AU)

(73) Assignee: Woodside Energy Ltd., Perth, Western Australia ( * ) Notice: Subject to any disclaimer, the term of this patent is extended or adjusted under 35 U.S.C. 154(b) by 737 days.

(21) Appl. No.: 12/128,980

(22) Filed: May 29, 2008

(65) Prior Publication Data

US 2009/0296518 A1    Dec. 3, 2009

(51) Int. Cl.
*G01V 1/38*    (2006.01)

(52) U.S. Cl.
USPC ............................................................ 367/20

(58) Field of Classification Search
USPC ...................................................... 367/15–24
See application file for complete search history.

(56) References Cited

U.S. PATENT DOCUMENTS

| | | | |
|---|---|---|---|
| 3,806,863 A * | 4/1974 | Tilley et al. ..................... | 367/21 |
| 3,921,124 A * | 11/1975 | Payton ............................ | 367/17 |
| 4,486,863 A | 12/1984 | French | |
| 5,963,879 A * | 10/1999 | Woodward et al. ............. | 702/17 |
| 7,026,819 B2 | 4/2006 | Eidesmo et al. | |
| 7,492,665 B2 * | 2/2009 | Robertsson et al. ............ | 367/40 |
| 2006/0132137 A1 | 6/2006 | MacGregor et al. | |
| 2008/0285381 A1* | 11/2008 | Moldoveanu et al. .......... | 367/20 |

OTHER PUBLICATIONS

Howard, "Marine seismic surveys with enhanced azimuth coverage: Lessons in survey design and acquisition," The Leading Edge, Apr. 2007.*
Lopes et al, "Processing of high-resolution, deep-tow marine seismic data," The leading Edge, Jan. 1996.*
Hernandez et al, "PASISAR: Processing of very-high resolution near-bottom seismic data," IEEE, 1994.*
International Search Report for PCT/AU2009/000673 (issued May 29, 2009).

* cited by examiner

*Primary Examiner* — Isam Alsomiri
*Assistant Examiner* — Krystine Breier
(74) *Attorney, Agent, or Firm* — Edell, Shapiro & Finnan, LLC

(57) ABSTRACT

A method of acquiring marine seismic data using an acoustic source to generate an acoustic signal, a portion of which is reflected at one or more subsurface formation interfaces as a seismic signal, includes: a) sailing a surface vessel along a sinusoidal sail line which lies over an area to be surveyed while towing one or more seismic streamers, each streamer including a plurality of hydrophones to receive the reflected seismic signals, where the streamer follows the sinusoidal sail line while seismic data is acquired. In one embodiment, the method further comprises b) dividing the area to be surveyed using a grid to form a plurality of bins; c) collating the seismic signals using the plurality of bins; and, d) repeating step a) to populate each bin with seismic data, where a range of offsets associated with each event varies between adjacent cross-line and in-line bins.

34 Claims, 14 Drawing Sheets

METHOD OF MARINE SEISMIC DATA ACQUISITION

FIELD OF THE INVENTION

The present invention relates to the field of marine seismic data acquisition methods and processes.

BACKGROUND OF THE INVENTION

Surveys over geological structures are generally conducted using seismic data acquisition methods or electromagnetic acquisition methods. Marine seismic exploration investigates and maps the structure and character of subsurface geological formations underlying a body of water. Using conventional acquisition techniques, an ocean-going vessel is used to tow one or more acoustic sources and one or more seismic streamer cables through the ocean along predetermined sail lines. A suitable acoustic source is created by the collapsing of an air bubble, and prior art acoustic sources typically comprise compressed air guns for generating acoustic energy in the water called 'shots'. The basis of marine seismic data acquisition methods is the accurate timing of artificially generated pulses of acoustic wave energy that propagate through the ocean and are reflected at the interfaces between subsurface formations. These reflected pulses which are referred to as "seismic energy" or "seismic signals" (because of the interaction of the acoustic energy with the geological formation) are detected using transducers called hydrophones that transform the seismic energy into electromagnetic signals. Each streamer towed behind the vessel typically supports multiple hydrophones and the data collected by each hydrophone is recorded and processed to provide information about the underlying subsurface geological features. Using conventional acquisition techniques, towing of the streamers is undertaken at a predetermined speed and along predefined parallel and linear sail lines to assist with the collection and processing of the data acquired by the hydrophones.

A portion of the acoustic energy fired from an acoustic source travels downwardly through a body of water towards a subsurface geological and a portion thereof is reflected upward from the subsurface geological formation as a response signal. This response signal is collected at a hydrophone. The amplitude and the time taken for the response signal to be received at the hydrophone are indicative to some degree of the depth of subsurface geological formation. At the time that the data is being collected at the hydrophones, there is no existing knowledge as to the extent in area of the subsurface formation (as defined by its x and y co-ordinates) or the depth z of the subsurface interfaces at which seismic energy is reflected. Mathematical operations based on the acoustic wave equation above are used to "migrate" the signals collected by the hydrophones to their x, y and depth co-ordinates of the subsurface reflection points. All of these "migration" algorithms require stable and consistent spatial sampling of the measured wave field in order to accurately reconstruct the correct position, depth and importantly the amplitude and phase of the signal which may get used later in the upstream flow for hydrocarbon prediction.

The use of one streamer towed along a single linear sail line at a time (such as the arrangement illustrated in FIG. 4) collects a limited set of what is referred to as a "2-D in-line seismic data", which is a useful and relatively inexpensive way of conducting a marine seismic survey. When a single streamer is towed along a single sail line, cross-line data is not acquired and the data set has an azimuth of essentially 0±10 degrees which is the industry accepted limited of feather tolerated when acquiring 2D in-line data using the methods of the prior art. These signals received by the hydrophones can be collated together in what is termed a "gather" by collecting the source-hydrophone pairs that share a CMP. The number of source/hydrophone pairs that make up a gather is subsequently termed the "fold" of the gather.

A "3-D seismic data set" is generated when multiple streamers are towed in parallel along a single linear sail line. It is not unusual for the streamers to be spaced up to 100 meters apart and be 6000 meters long. The number of streamers and the size of the area being surveyed determine to a large degree the cost of a seismic survey. The size of the vessels required to tow these long streamers over vast areas of ocean also contribute substantially to the cost of the survey. Due to the total number of sail lines required to build coverage of an area of interest, it is generally cheaper and therefore more desirable to use the prior art 3D acquisition methods than the prior art 2D acquisition methods described above. By way of example, assuming that the area being surveys is 50 km wide and 20 km across and using the 3D streamer array of FIG. 8, the full survey area can be traverse using 80 parallel sail lines at a distance of 250 meters apart. To collect the same density of data using the prior art 2D seismic acquisition arrangement of FIG. 4 would require 400 sail lines to be traversed. This gives a cross-line bin dimension of 50 meters.

Using either 2D or 3D surveying, multiple parallel adjacent linear sail lines are traversed so that the traversed ocean surface area overlays the subsurface area of interest. Using the methods of the prior art, the quality of the acquisition of seismic data relies to some extent on the skill of the towing vessel operator to accurately traverse the predefined parallel adjacent linear sail line/s and their ability to ensure that the orientation of each streamer is maintained parallel to and in line with the linear sail lines. When there are multiple streamers as used for 3D seismic acquisition, that task is not only very difficult but is also critical to the quality of the information collected. It is not uncommon to abandon a survey part way through because the streamers can not be kept parallel to the sail line due to loss or lack of control or strong currents and adverse weather conditions and consequently great expense can be incurred because of delays or the need to redo all or part of a predefined sail line.

Methods exist in which marine seismic data is acquired while following a non-linear sail line. U.S. Pat. No. 4,486,863 discloses a method wherein the streamer towing ship moves along circular paths and the streamer follows this circular path. Each of the circles is offset along an advancing line. The towing ship completes a full circle and then leaves the completed circle tangentially to move on from one circle to the next. There is a finite amount of curvature that can be put on a streamer resulting in a large track distance ratio (i.e. a large ratio between the actual distance traversed by the vessel compared with the nominal sail-line distance). This is a very inefficient way to collect 3D seismic data, and the additional time taken to acquire the data equates to an increase in the cost of the acquisition. U.S. Pat. No. 4,965,773 discloses a method of gathering and mapping seismic data of a marine region which contains a stationary body comprising the steps of defining a spiral path using a point on the body as the origin of the spiral, and towing a transmitter/receiver streamer along the spiral path to gather seismic data. The method is directed for use in data collection around objects such as small islands, salt fingers present in the substratum of similar point-like structures. In the preferred embodiment, the radial distance between the spiral turns is constant as given by an Archimedean spiral. This is also a very inefficient way to collect 3D seismic data, and the additional time taken to acquire the data equates to an increase in the cost of the acquisition. There remains a need in the art for an alternative marine seismic data acquisition method and related system.

There remains a need in the art for an alternative marine seismic data acquisition method and related system.

SUMMARY OF THE INVENTION

According to a first aspect of the present invention there is provided a method of acquiring marine seismic data using an acoustic source to generate an acoustic signal, a portion of which is reflected at one or more subsurface formation interfaces as a seismic signal, the method comprising:

a) sailing a surface vessel along a sinusoidal sail line which lies over an area to be surveyed while towing one or more seismic streamers, each streamer including a plurality of hydrophones to receive the reflected seismic signals, wherein the streamer follows the sinusoidal sail line while seismic data is acquired.

The method may further comprise:

b) dividing the area to be surveyed using a grid to form a plurality of bins;

c) collating the seismic signals using the plurality of bins; and d) repeating step a) to populate each bin with seismic data, wherein a range of offsets associated with each event varies between adjacent cross-line and in-line bins.

The amplitude of the sinusoidal sail line may be in the range of 200 to 1600 meters or in the range of 800 to 1600 meters or in the range of 400 to 1200 meters.

For ease of processing the survey data, one or both of the wavelength and frequency of the sinusoidal sail line may be uniform during each pass over the survey area.

In one form, steps a) may be conducted as a surface vessel completes a first pass over the survey area and steps a) to d) are repeated as the surface vessel completes a second or subsequent pass over a survey area. When a multi-pass survey is conducted, the second pass and any subsequent pass may be staggered from the first pass or a previous pass along the length of the survey area by a distance equal to the amplitude of the sinusoidal configuration of the first pass or a previous pass. Alternatively or additionally, the second pass and each subsequent pass may be staggered from the first pass or a previous pass across the width of the survey area by one quarter of the wavelength of the sinusoidal configuration.

Alternatively or additionally, the second and any subsequent pass across the survey area can be acquired with the center line of the sinusoidal sail line being arranged at an angle to the center line of a previous sinusoidal sail line. The angle may be selected from the group consisting of: 30, 45, 60 or 90 degrees. In one form, at least three passes across the survey area are performed with the center line of each pass being arranged at 60 degrees to the center line of a preceding pass. In another form, at least two passes across the survey area are performed with the center line of each pass being arranged at 90 degrees to the center line.

In one form, the source may be one of a plurality of sources, and wherein one of the plurality of sources transmits a signal from a surface vessel travelling along a nominal linear sail line and another of the plurality of sources transmits a signal from a surface vessel travelling along a sinusoidal sail line. Preferably, the geological feature is suitable for bearing hydrocarbons.

According to a second aspect of the present invention there is provided a method of undertaking a seismic survey over a geological structure within a survey area, the method comprising the steps of:

a) transmitting an acoustic source signal from a source;

b) measuring a response signal at each of a plurality of hydrophones arrayed in the survey area, the response signal being indicative of an interaction between the source signal and the geological structure;

c) logging the orientation and position of the source relative to the plurality of hydrophones; and;

d) gathering a plurality of response signals for a range of source/hydrophone pairs to provide a survey data set, the method characterised in that the source and the plurality of hydrophones are arranged in a sinusoidal configuration relative to a nominal linear sail line whereby the survey data set includes a variable offset range in both the in-line and cross-line directions.

The amplitude of the sinusoidal sail line may be in the range of 200 to 1600 meters or in the range of 800 to 1600 meters or in the range of 400 to 1200 meters.

For ease of processing the survey data, one or both of the wavelength and frequency of the sinusoidal sail line may be uniform during each pass over the survey area.

In one form, steps a) may be conducted as a surface vessel completes a first pass over the survey area and steps a) to d) are repeated as the surface vessel completes a second or subsequent pass over a survey area. When a multi-pass survey is conducted, the second pass and any subsequent pass may be staggered from the first pass or a previous pass along the length of the survey area by a distance equal to the amplitude of the sinusoidal configuration of the first pass or a previous pass. Alternatively or additionally, the second pass and each subsequent pass may be staggered from the first pass or a previous pass across the width of the survey area by one quarter of the wavelength of the sinusoidal configuration.

Alternatively or additionally, the second and any subsequent pass across the survey area can be acquired with the center line of the sinusoidal sail line being arranged at an angle to the center line of a previous sinusoidal sail line. The angle may be selected from the group consisting of: 30, 45, 60 or 90 degrees. In one form, at least three passes across the survey area are performed with the center line of each pass being arranged at 60 degrees to the center line of a preceding pass. In another form, at least two passes across the survey area are performed with the center line of each pass being arranged at 90 degrees to the center line.

In one form, the source may be one of a plurality of sources, and wherein one of the plurality of sources transmits a signal from a surface vessel travelling along a nominal linear sail line and another of the plurality of sources transmits a signal from a surface vessel travelling along a sinusoidal sail line. Preferably, the geological feature is suitable for bearing hydrocarbons.

For ease of processing, the amplitude of the sinusoidal configuration may be uniform during each pass over the survey area. Alternatively or additionally, one or both of the wavelength and frequency of the sinusoidal configuration is uniform during each pass over the survey area.

In one form, the source is located at or below the surface of a body of water, and the plurality of hydrophones is located on or close to the seabed or the bed of some other body of water.

In one form, the streamer is one of a plurality of streamers being towed along a sinusoidal sail line by a surface vessel and wherein each streamer is separated from each neighbouring streamer by a distance in the range of 150 to 400 m.

According to a third aspect of the present invention there is provided a method of planning a survey of an area that is thought or known to contain a subterranean hydrocarbon bearing reservoir, comprising:

creating a model of the area to be surveyed including a seafloor, a rock formation containing a postulated hydrocarbon bearing reservoir beneath the seafloor, and a body of water above the seafloor;

setting values for depth below the seafloor of the postulated hydrocarbon reservoir and material properties of the geological structure; and performing a simulation of steps a) to d) of the second aspect of the present invention.

According to a fourth aspect of the present invention there is provided a survey data acquisition system comprising:

a source for transmitting a source signal;

a plurality of hydrophones arrayed in the survey area for measuring a response signal at each hydrophone, the response signal being indicative of an interaction between the source signal and the geological structure;

means for logging the orientation and position of the source relative to the plurality of hydrophones; and;

means for gathering a plurality of response signals for a range of source/hydrophone pairs to provide a survey data set, characterised in that the source and the plurality of hydrophones are arranged in a sinusoidal configuration relative to a nominal linear sail line whereby the survey data set includes a variable offset range in both the in-line and cross-line directions.

According to a fifth aspect of the present invention there is provided a method of storing and utilizing marine survey data comprising:

obtaining a survey data set using the method of the first aspect of the present invention; and analyzing the survey data set to obtain information relating to a geological structure underlying a body of water.

BRIEF DESCRIPTION OF THE DRAWINGS

The manner in which the objectives of the invention and other desirable characteristics can be obtained is explained in the following description and attached figures in which.

It is to be noted that the figures are not to scale and illustrate only typical embodiments of this invention, and are therefore not to be considered limiting of its scope, for the invention may admit to other equally effective embodiments. Like reference numerals refer to like parts.

DETAILED DESCRIPTION OF SPECIFIC EMBODIMENTS

Particular embodiments of the present invention are now described. However, it will be understood by those skilled in the art that the present invention may be practiced without these details and that numerous variations or modifications from the described embodiments may be possible. It will be understood that the invention is equally applicable to surveying in freshwater, for example large lakes or estuaries, as it is to seawater. Thus references below to the seabed should not be regarded as limiting and should be interpreted as covering a lakebed, riverbed or equivalent. The terminology used herein is for the purpose of describing particular embodiments only, and is not intended to limit the scope of the present invention. Unless defined otherwise, all technical and scientific terms used herein have the same meanings as commonly understood by one of ordinary skill in the art to which this invention belongs.

The term "sinusoidal" as used throughout this specification refers to a smoothly varying periodic oscillating waveform which has a fundamental shape expressed by the equation y=A sin x, where x is an angle measured in degrees and A is the amplitude of the wave. It should be noted that a cosine wave can also be considered to be "sinusoidal" because cos (x)=sin(x+π/2). The term "amplitude" refers to the distance from one extremity of an oscillation of a sine wave to the middle point or center line of the sine wave. The term "frequency" refers to the number of oscillations of a wave per unit time. The frequency thus represents the rate at which the fundamental shape repeats itself. The term "wavelength" refers to the distance, measured in the direction of propagation of a wave, between two successive points that are characterised by the same phase of oscillation.

Figure 1:
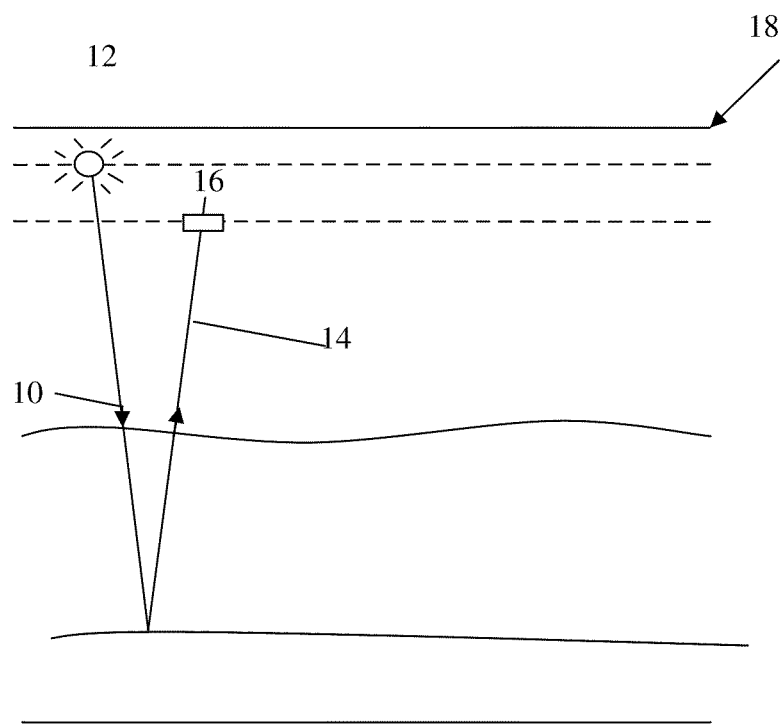
FIG. 1 schematically illustrates a source signal being transmitted from a source and a response signal being measured at each of a plurality of receivers arrayed in a survey area, the response signal being indicative of an interaction between the source signal and the geological structure.

A first embodiment of the present invention is now described with reference to FIGS. 1 to 10 in which a seismic survey is undertaken over a geological structure within a survey area. A second embodiment is then described below with reference to FIGS. 11 and 12, with alternative embodiments described with reference to FIGS. 13 and 14. With reference to FIG. 1, the method comprises the steps of a) transmitting a source signal (10) from a source (12); b) measuring a response signal (14) at each of a plurality of receivers or hydrophones (16) arrayed in the survey area (18), the response signal (14) being indicative of an interaction between the source signal (10) and a geological structure (20); c) logging the orientation and position of the source (12) relative to the plurality of hydrophones (16); and; d) gathering a plurality of response signals (14) for a range of source/receiver pairs to provide a survey data set. The method characterised in that the source (12) and the plurality of hydrophones (16) are arranged in a sinusoidal configuration relative to a nominal linear sail line whereby the survey data set includes a variable offset range in both the in-line and cross-line directions.

A second embodiment of the present invention is now described with reference to FIGS. 2 to 10 in which a seismic survey is conducted using an acoustic source (112). A streamer-towing vessel (114) is shown FIGS. 2 to 7 traversing a sinusoidal sail line (116) which lies over a survey area (118) while towing a single seismic streamer (120). The acoustic source (112) is used to generate an acoustic source signal, a portion of which is reflected at one or more subsurface formation interfaces as a seismic response signal. The seismic response signal is measured at each of a plurality of hydrophones arranged at spaced apart intervals along the length of the single seismic streamer (120). The seismic response signal could equally be acquired using a plurality of hydrophones and/or geophones arranged within an ocean bottom cable resting on the seafloor. Each streamer (120) has a first proximal end (122) and a second distal end (124), the first proximal end (122) being that end of the streamer (120) that is located closest to the vessel (114). In the embodiment illustrated in FIGS. 2 to 7, a single acoustic source (112) is used along with a single streamer (120), the acoustic source (112) travelling with the vessel (114) that is used to tow the single streamer (120). Other source/streamer configurations are described below with reference to FIG. 10a to 10e.

The method and system of the present invention differs fundamentally from those of the prior art in that, instead of following a nominal linear sail line (126) as it crosses the survey area (118), the streamer-towing vessel (114) follows a sinusoidal sail line (116). The speed and direction of the vessel (114) is set at suitable values to encourage the streamer (120) to follow the sinusoidal sail line (116) while seismic data is being acquired. The use of a sinusoidal sail line provides a number of benefits over the prior art. Firstly, the method of the present invention allows the use of current streamer technology, as the stress and strain on the streamer is essentially the same as that experienced by streamers performing conventional 3D or 2D acquisition when the vessel turns at the end of a given pass across the survey area, in preparation for the next acquisition pass across the survey area. This overcomes any expense associated with developing specialist streamers. Secondly, the seismic data set acquired will have a time and space variant azimuthal content which may help 3D subsurface information to be ascertained, even while using only one streamer, as explained in greater detail below.

Figure 2:
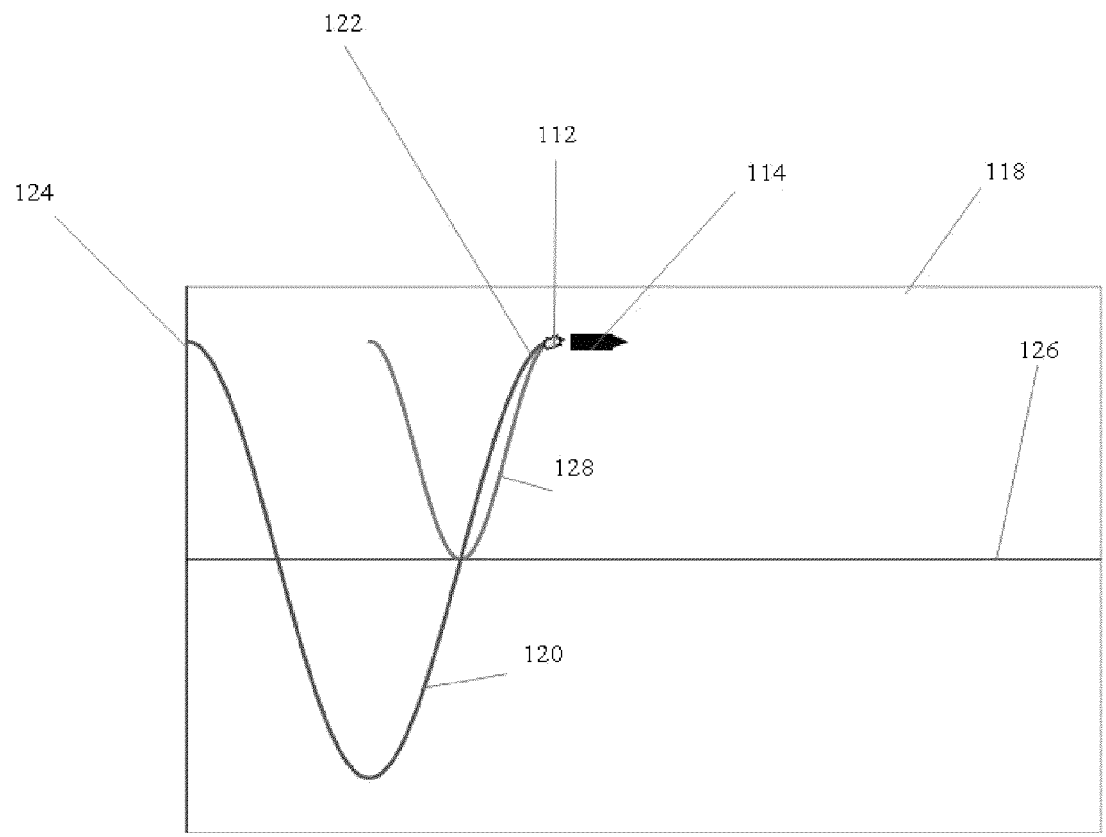
FIG. 2 illustrates a sinusoidal sail line illustrating a corresponding seismic coverage line for the common mid points of a given shot.
Figure 3A:
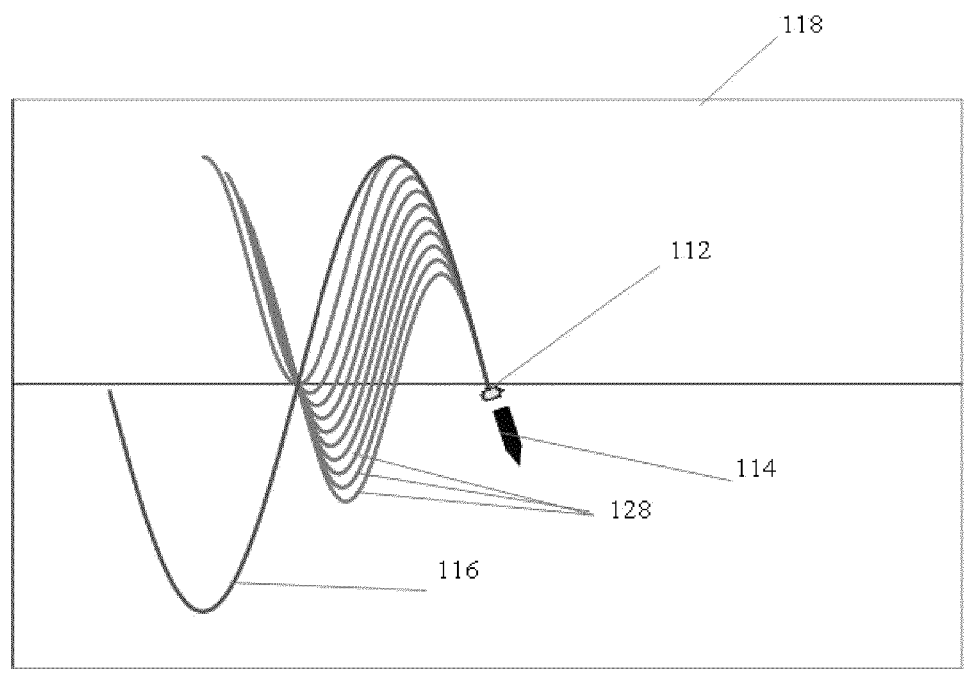
FIGS. 3a to 3d illustrate the seismic coverage lines for a plurality of shots as the streamer towing vessel traverses the sinusoidal sail line.
Figure 3B:
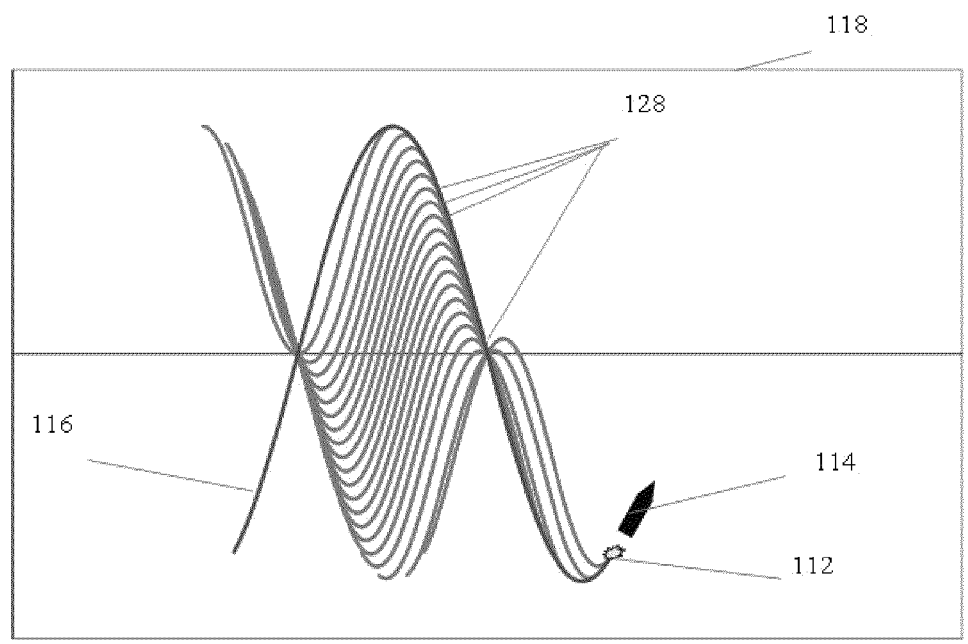
Figure 3C:
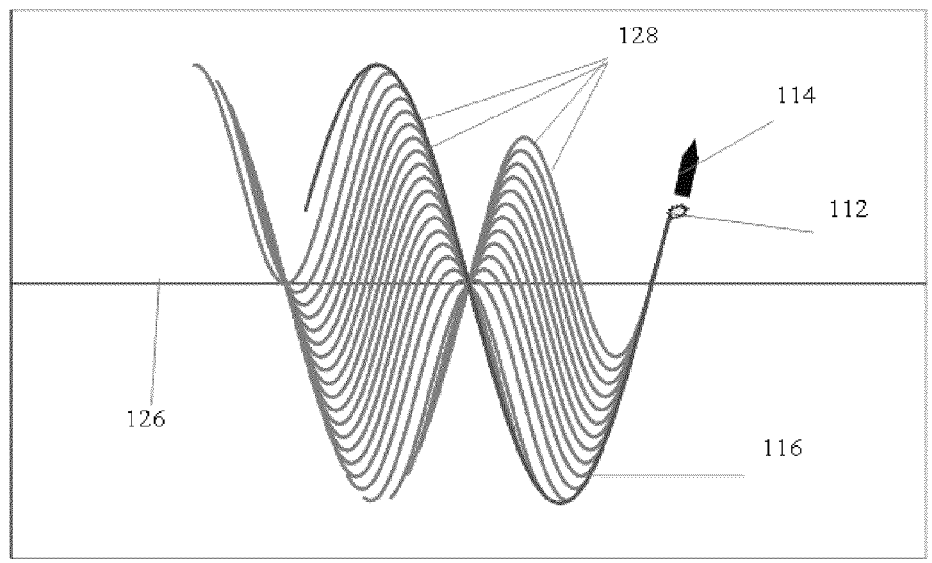
Figure 3D:
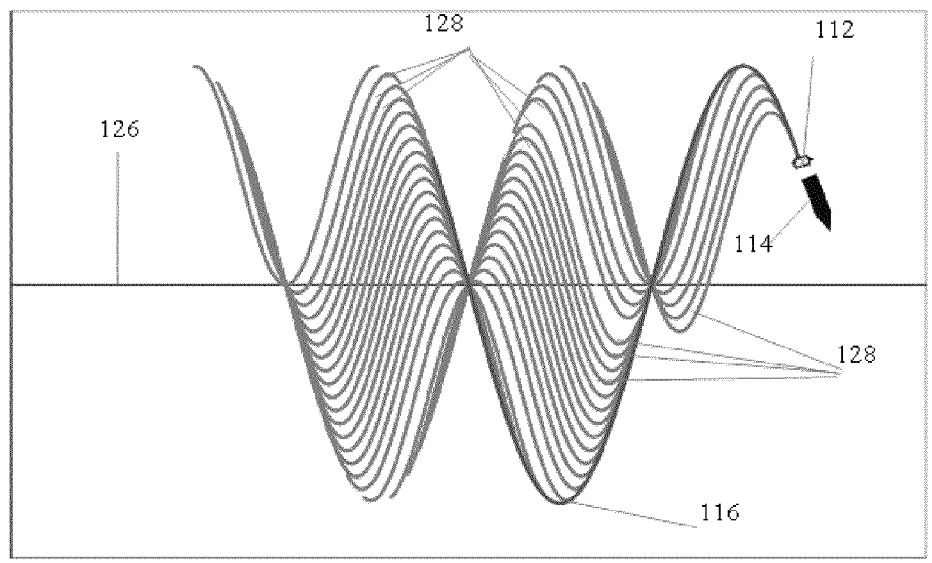

The common mid points of the various source/hydrophone pairs are plotted in a manner analogous to that described above for prior art seismic acquisition methods. As a consequence of causing the streamer (120) to follow the sinusoidal path of the sail line (116), seismic data signals are collected at common mid points which fall along surface mid-point coverage line (128) for each shot from the source. One such coverage line (128) is shown in FIG. 2 for a first shot. As a plurality of successive shots are fired, a corresponding configuration of coverage lines (128) are generated, with ten such coverage lines (128) illustrated in FIG. 3a, twenty such coverage lines (128) illustrated in FIG. 3b, thirty such coverage lines (128) illustrated in FIG. 3c and forty such coverage lines (128) illustrated in FIG. 3d. As can be seen from FIGS. 3a to 3d, each successive coverage line (128) is offset from each preceding coverage line (128) due to the fact that the vessel (114) continues to move along the sinusoidal sail line (116) between successive shots. The combined effect of all of these surface mid-point coverage lines is a area (thus 3D) of midpoint coverage designated with reference numeral (130).

Figure 4:
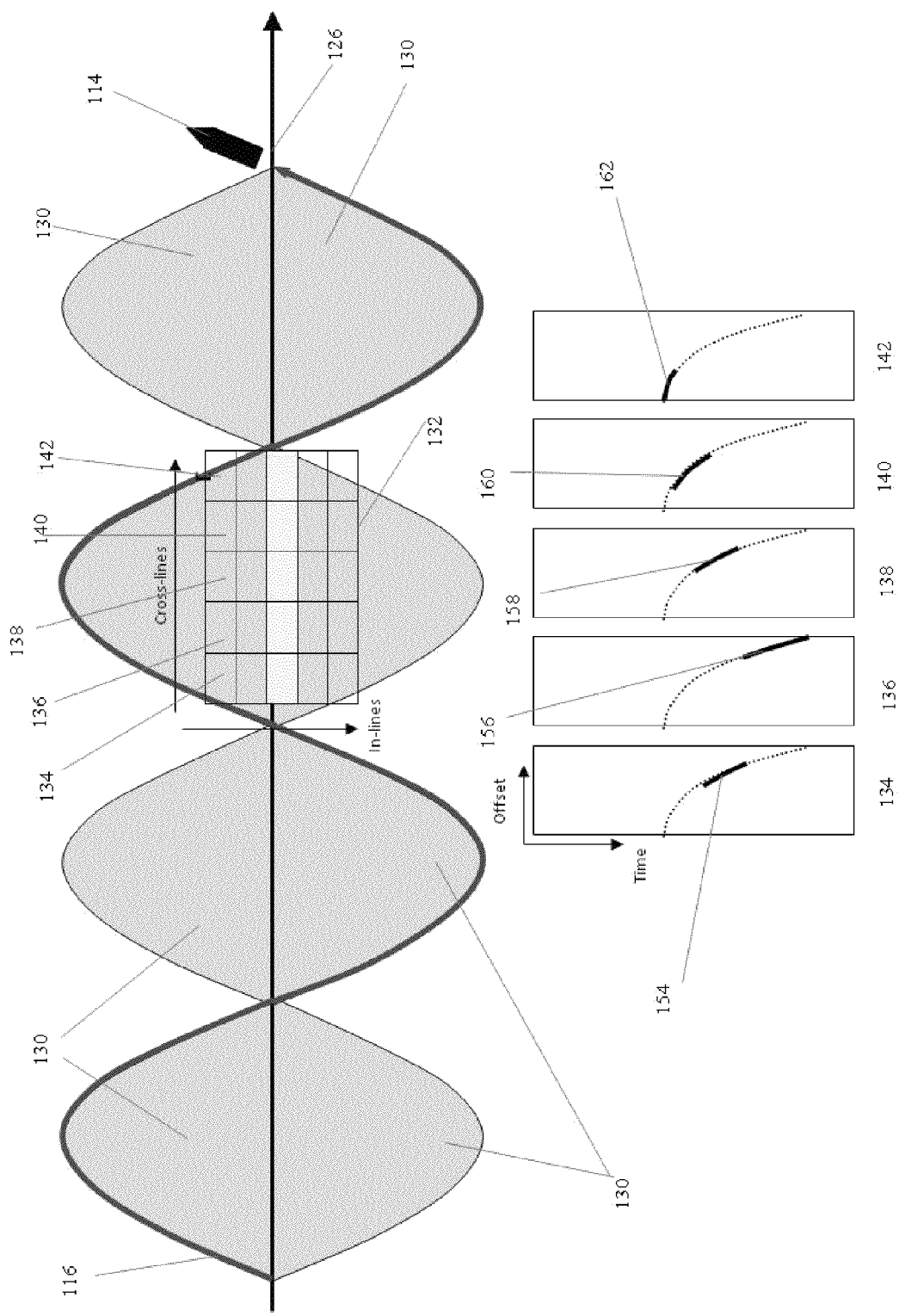
FIG. 4 illustrates the event data collected in five adjacent cross-line bins while the streamer towing vessel of FIG. 10 follows a sinusoidal sail line.

With reference to FIG. 4, the shaded acquisition areas (130) represent the area over which seismic signals are collected as the streamer travels along a sinusoidal sail line path (116) during a single first pass (174) across the survey area (118). The survey area (118) is divided into a plurality of bins (132) using a grid in a manner analogous to that described above for prior art seismic acquisition methods. Depending on the amplitude and frequency of the sinusoidal sail line (116), the survey area (118) covered using the method of the present invention is comparable to the area covered using the prior art 3D multiple streamer configurations. The offset range is defined by the absolute difference between the minimum and maximum offset present in a bin gather. Using conventional acquisition, every bin (132) is populated with a full complement of offsets ranging from the near offset to the far offset. By comparison, the method and process of the present invention produces a variable offset range in both the in-line and cross-line direction.

Figure 5:
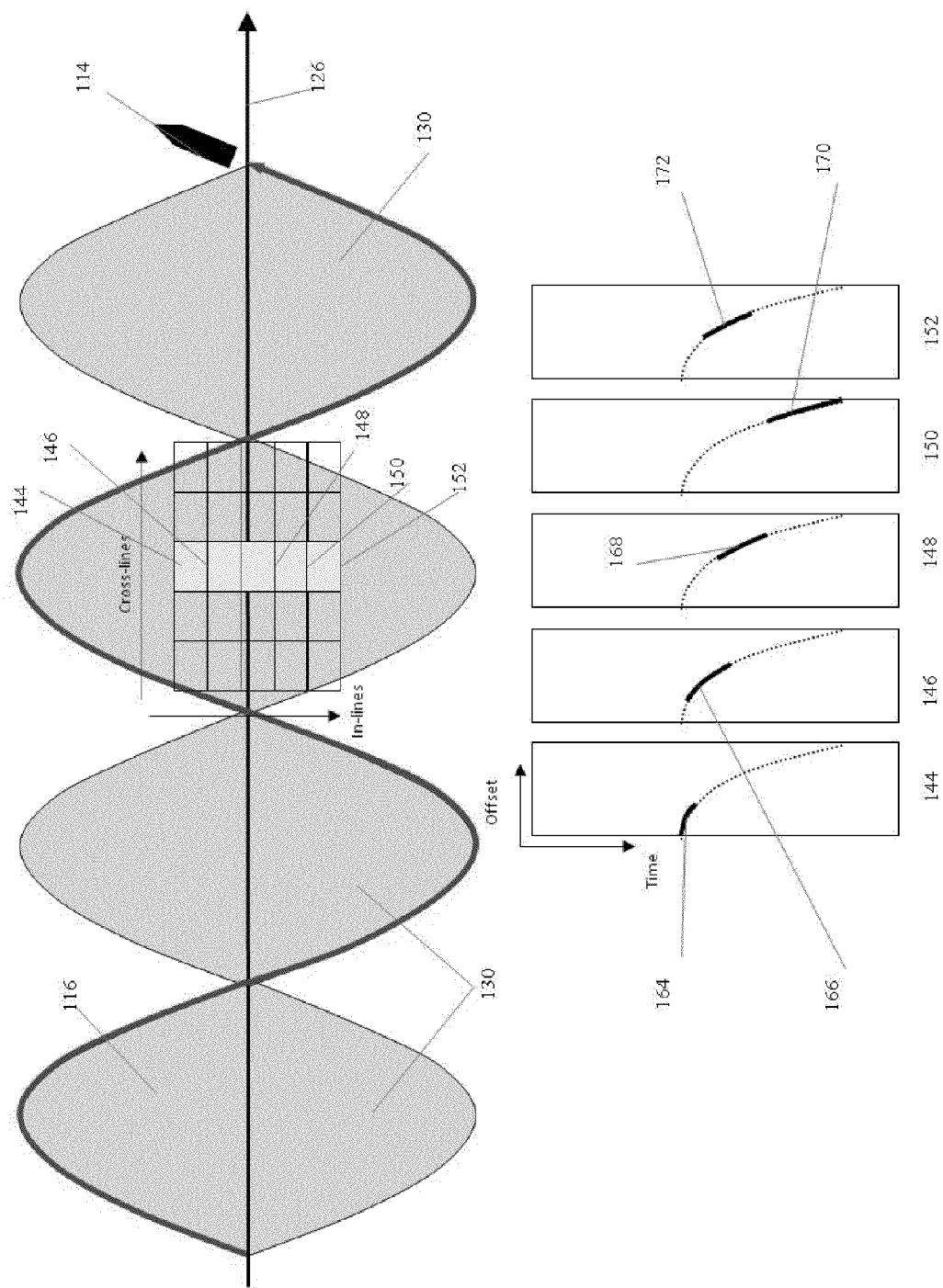
FIG. 5 illustrates the event data collected in five adjacent in-line bins while the streamer towing vessel of FIG. 10 follows a sinusoidal sail line.

The breakout portion below the sail line pictorial in FIG. 4 illustrates the event data collected in five adjacent cross-line bins (134), (136), (138), (140) and (142) as a function of offset on the x-axis versus time on the y-axis. The breakout portion below the sail line pictorial in FIG. 5 illustrates the event data collected in five adjacent in-line bins (144), (146), (148), (150) and (152) as a function of offset on the x-axis versus time on the y-axis. In each of the five adjacent cross-line bins (134), (136), (138), (140) and (142), a corresponding event is depicted using a plurality of solid lines (154), (156), (158), (160) and (162) to represent the partial offsets recorded in each bin and a dotted line which represents the potential full range of offsets that would have been measured using prior art 3D multi-streamer linear acquisition methods. It can be seen from FIG. 4, that there are different offsets associated with a single event in the adjacent cross-line bins (134), (136), (138), (140) and (142). Similarly, in each of the adjacent in-line bins, (144), (146), (148), (150) and (152), a corresponding event is depicted using a plurality of solid lines (164), (166), (168), (170) and (172) to represent the partial offsets recorded in each bin and a dotted line which represents the potential full range of offsets that would have been measured using prior art 3D linear multi-streamer acquisition methods. It can be seen from FIG. 5, that there are different offsets associated with a single event in the adjacent in-line bins (144), (146), (148), (150) and (152) as compared to the offsets associated with the same event in the adjacent cross-line bins (134), (136), (138), (140) and (142).

As best seen in FIG. 3a to 3d, the streamer location varies in position and time is such as way that at each successive shot, the data is being acquired over a different range of common mid-points. Moreover, the streamer location deviates from the center line of the sinusoidal sail path (116) over time, resulting in a variation in cross-line and in-line offsets with time.

The offset range in each bin (132) using the method of the present invention will depend on such relevant factors as the frequency of the shots, the number and location of acoustic sources (112) used, the number and distribution of hydrophones along the length of the streamer (120), the sinuosity of the sail line, and the number and arrangement of streamers used. By way of example, the streamer can be 3 km long with 120 hydrophones spaced at intervals of 25 m along the length of the streamer. It is to be understood that the length of the streamer can vary between 3 km to 8 km. Generally speaking, the longer the streamer, the greater the number of hydrophones are available for collecting data and the greater the fold in the data. However, longer streamers result in longer offsets which can make it more difficult to process the data that is acquired. Consequently, a balance needs to be sought, with best results achieved using a streamer length in the range of 4.5 to 5 km for some types of hydrocarbon exploration or development objectives.

Figure 6:
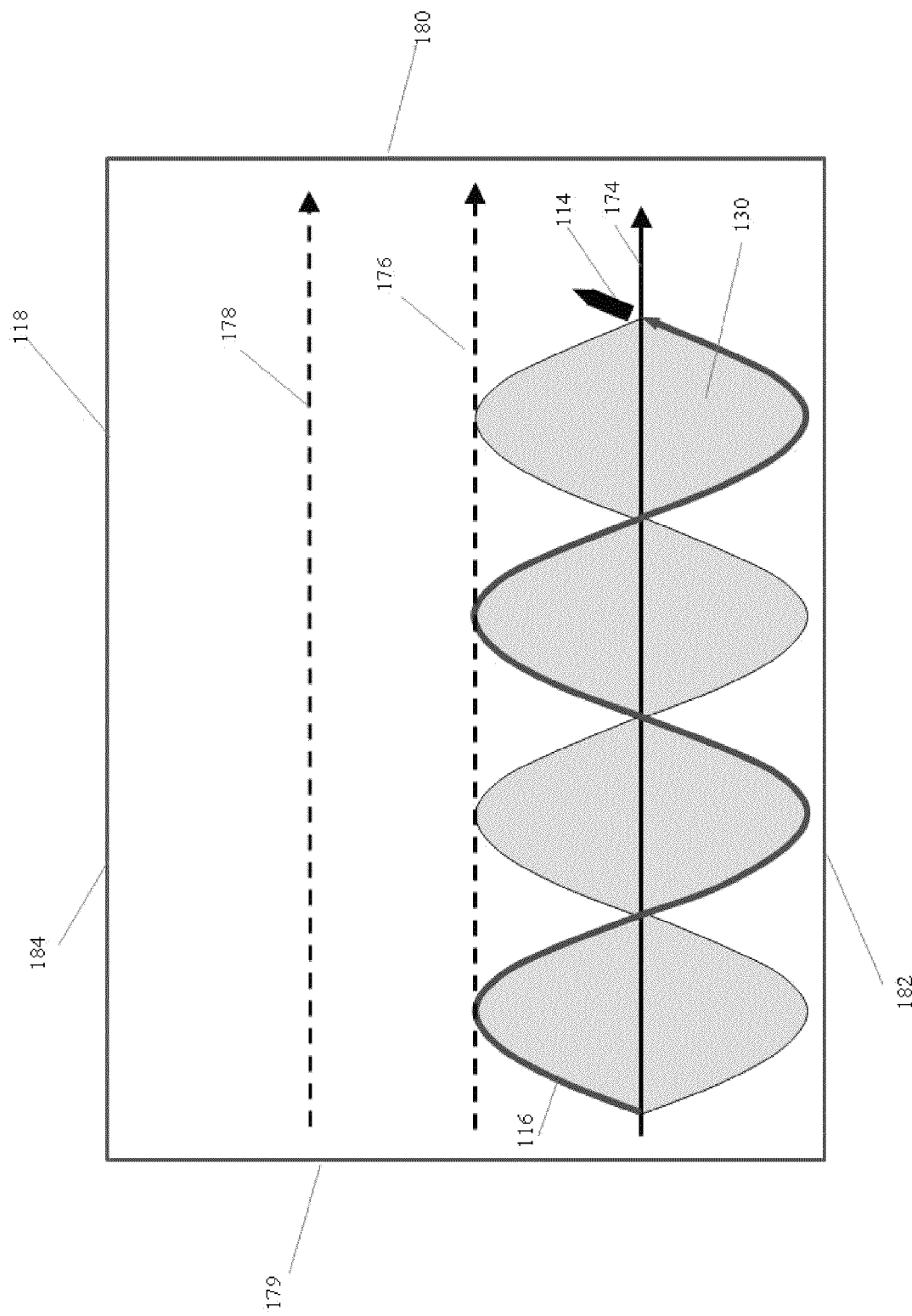
FIG. 6 illustrates a top view of a survey area showing the acquisition coverage for a first pass across the survey area.
Figure 7:
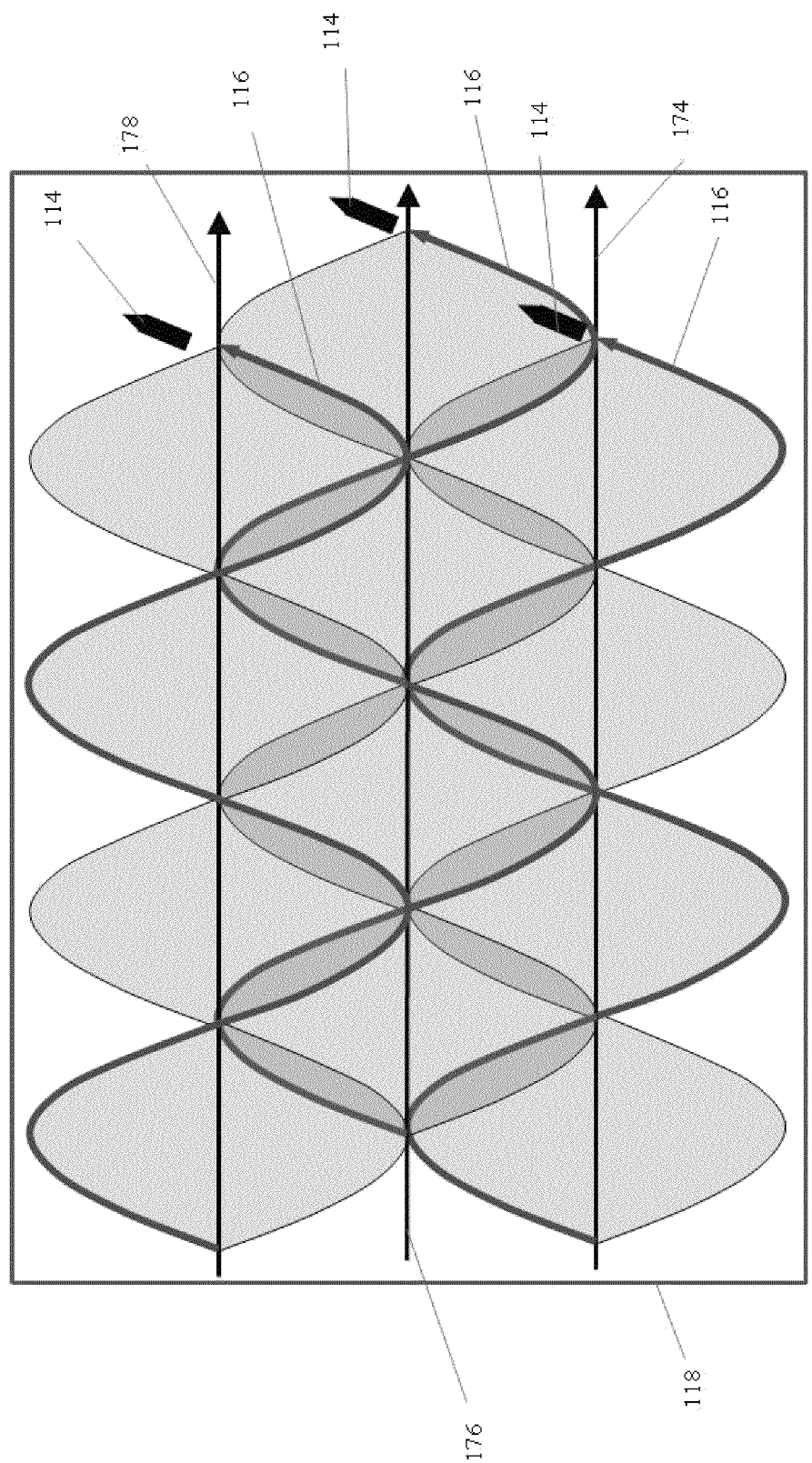
FIG. 7 illustrates a top view of a survey area showing the acquisition coverage for a three passes across the survey area.

The fold, azimuth and coverage using the method of the present invention are all dependant on a number of relevant variables, the main ones being related to the level of sinuosity of the sail line (116) relative to the length of the streamer (120). The sinuosity is set by the amplitude, wavelength and frequency of the sinusoidal sail line (116) during any given pass across the survey area (118). For consistency of results, the amplitude, wavelength and frequency of the sinusoidal sail line is kept uniform during each pass (174) and during each subsequent pass (178) across the survey area during acquisition as illustrated in FIGS. 6 and 7. When this is done, the velocity of the vessel (114) is adjusted to aid in keeping the amplitude and wavelength of the sinusoidal sail line (116) as uniform as possible and in this regard, the firing of shots is timed as a function of the changing position of the streamer (120) over time rather than following a regular shot firing schedule. It is to be understood that it is possible to vary one or all of the amplitude, wavelength and frequency along the sail line (116) but that this will make processing the data acquired more complicated. Acquisition can commence at any point in the sine wave, there being no requirement that a given pass across the survey area (118) start or end at the center line or at a peak of the sine wave, although acquiring data in this way may make it easier to process later on. For ease of interpretation of the data, the streamer (120) should complete at least one full wavelength of the nominated sine wave per pass across the survey area (118).

It is readily apparent from FIGS. 6 and 7, that the greater the amplitude of the sinusoidal sail line (116), the greater the coverage in a given data set per pass due to an increase in the acquisition area (130). However, there are limits on the degree to which the streamer (120) can be flexed which are dependent in part on the minimum radius of curvature at an inflection point which can be achieved for a given streamer design. Moreover, if the amplitude is too high, there is little difference between the method of the present invention and the conventional linear acquisition methods of the prior art. The best compromise is achieved using a sinusoidal sail line (116) having an amplitude in the range of 400 to 200 meters, with the range of 800 to 1600 meters being preferred.

The "fold" is defined by the number of traces with a common mid-point where that mid-point is exactly half the distance between a source/receiver pair. Conventional acquisition is designed to create a very regular fold. In contrast, the method and process of the present invention includes some areas of higher fold than other areas. However, using the process of the present invention provides complete spatial coverage for a given bin density as would be achieved using conventional multi-streamer 3D acquisition techniques using a single streamer instead of having to tow a multi-streamer array.

After a first pass (174) across the survey area (118) has been completed, a second pass (176) and subsequent passes (178) can be made to complete the acquisition, the number of subsequent passes (178) being dependent on the size of the survey area (118) relative to the amplitude of the sine wave of the sail line (116) during the first pass (174) or a previous pass.

With reference to FIGS. 6 and 7, the survey area (118) is shown in top view as a rectangular planar area having a width defined by the first side (179) and the second side (180) of a rectangle, and a length defined by the third side (182) and fourth side (184) of the rectangle. During each pass (174, 176 or 178) across the survey area (118), the vessel (114) travels across the width of the survey area (118) from the first side (179) to the second side (180) following a sinusoidal sail line (116), the center line of which is a linear nominal sail line (126) shown as a dotted line in FIG. 7. Looking at a completed first pass (174) across the survey area (116), seismic data is collected over the shaded area (130) in FIG. 7 for that pass.

As illustrated in FIG. 7, the second pass (176) and each subsequent pass (178) is staggered from the first pass (174) or a previous pass along the length of the survey area (118) by a distance equal to the amplitude of the sinusoidal sail line (116) travelled by the vessel (114) during the first pass (174) or a previous pass. The second pass (176) and each subsequent pass (178) is staggered from the first pass (174) or a previous pass across the width of the survey area (118) by one quarter of the wavelength of the sinusoidal sail line (116). This arrangement of passes represents one way of achieving good coverage across a survey area. Other arrangements are illustrated in FIG. 10a to 10e. It is apparent from FIG. 7 that when the shaded area (130) being acquired for a given pass (174) overlaps with the shaded area being surveyed for a subsequent pass (178), the bins which fall in the overlapping acquisition area gather data from the same event but for a different partial range of offsets.

Figure 8A:
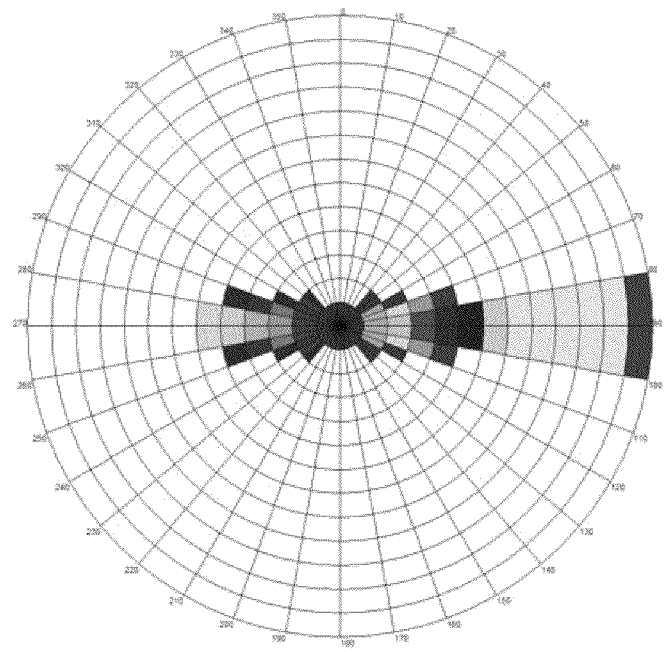
FIGS. 8a and 8b is a side-by-side comparison of a Rose diagram for a conventional 3D multi-streamer configuration and a Rose diagram for one embodiment of the method of the present invention.
Figure 8B:
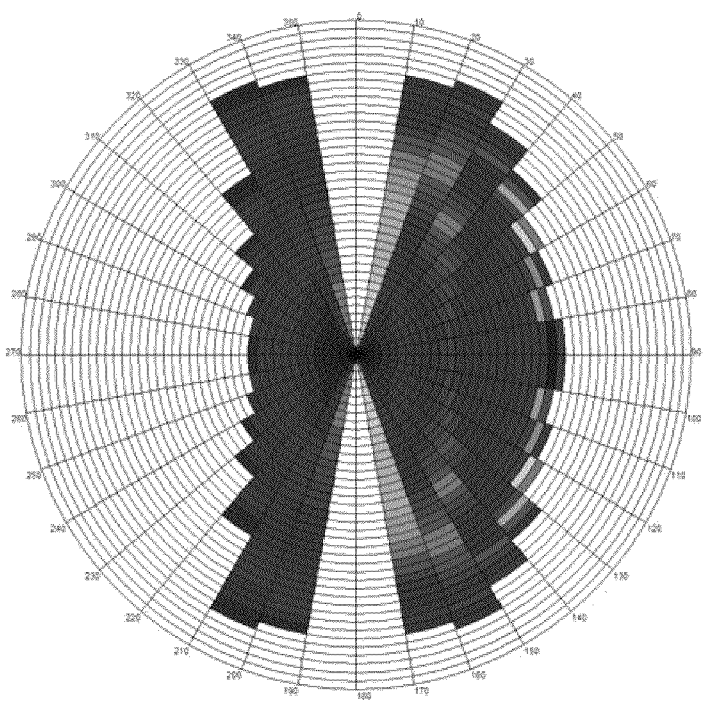
Figure 9A:
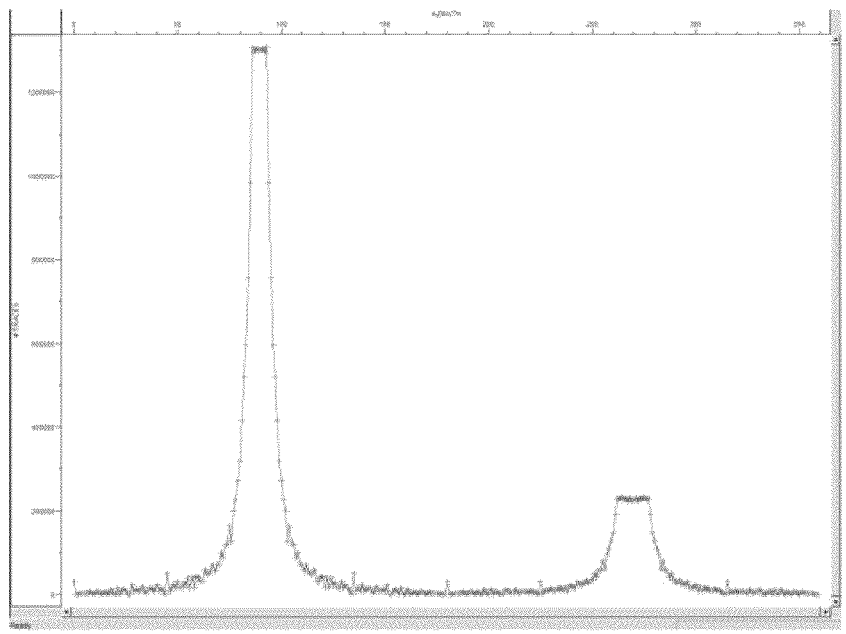
FIGS. 9a and 9b is a side-by-side comparison of the azimuthal distribution for a conventional 3D multi-streamer configuration and the azimuthal distribution for one embodiment of the method of the present invention.
Figure 9B:
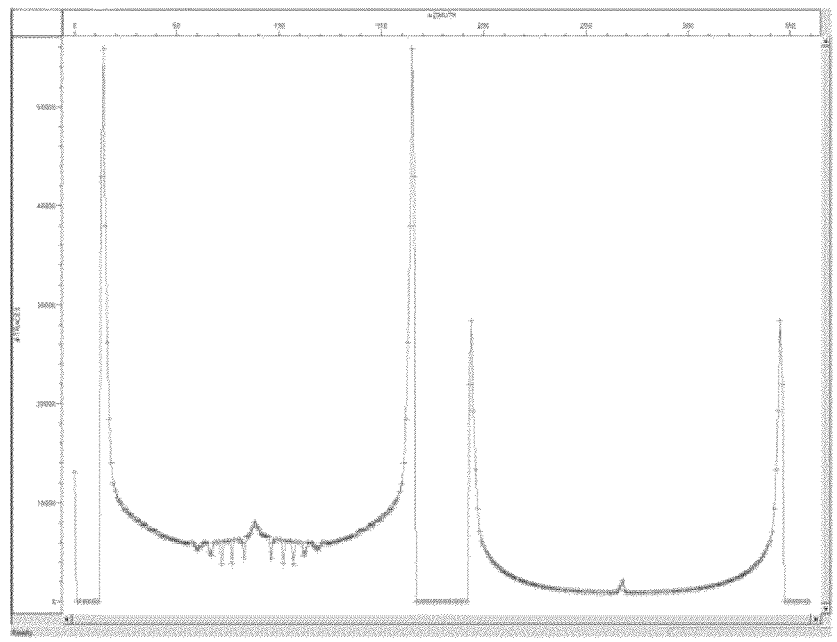

The "azimuth" is the angle of a line defined by the source and receiver coordinates of a measured seismic trace measured in degree clockwise from the North. A Rose diagram describes the overall azimuthal distribution of an acquisition configuration design. The distance from the center describes the offset while the angle from North defines the azimuth FIG. 8a shows a Rose diagram of a conventional 3D acquisition process while FIG. 8b shows a Rose diagram using the method and process of the present invention after the vessel (114) has travelled one wavelength along the sinusoidal sail line (116). FIGS. 9a and 9b shows a side-by-side comparison of the percentile distribution of seismic data as a function of specific azimuths. FIG. 9a shows the percentile distribution for conventional acquisition which shows peaks in the nominal acquisition direction. FIG. 9b shows the percentile distribution for the process of the present invention showing how the data is scattered more evenly over a broader span of azimuths.

Each of FIGS. 10a-e depicts alternative embodiments of the present invention. In these embodiments, each towing vessel is shown as symbol 114 and the approximate location of the acoustic source or 'shot gun' is depicted as symbol 112. The nominal sail line direction per pass (126) is illustrated using dotted and dashed lines with the sinusoidal sail line (116) being illustrated as a solid line with an arrow at one end to indicate the direction of travel of the vessel (114). Clearly, all the configurations illustrated in FIGS. 10a-e have different economic costs but it is however an operator decision to choose to use a more expensive towing configuration if the task is completed more quickly or the increased usefulness of the results justifies the cost differential.

Figure 10A:
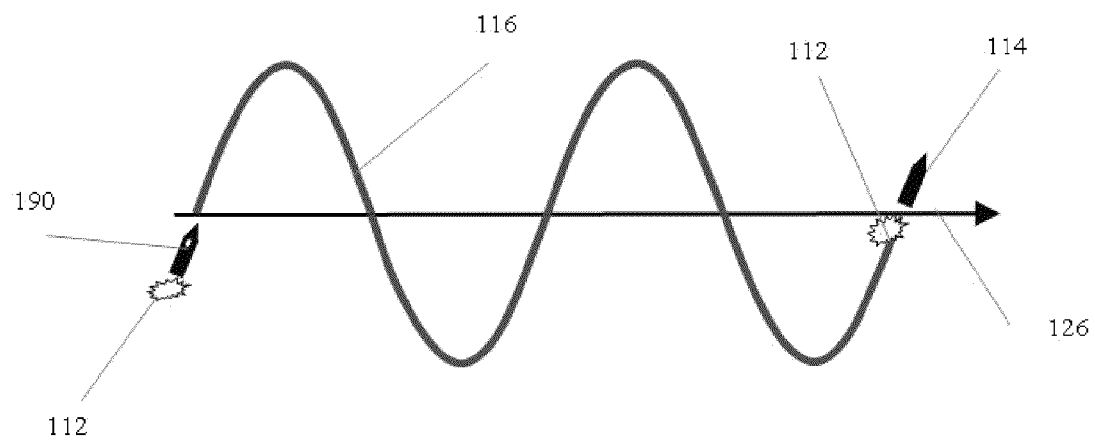
FIG. 10a to 10e illustrates various streamer-source arrangements for acquiring data using various embodiments of the method of the present invention.

FIG. 10a shows a variation on the configuration of FIG. 3 at least two acoustic sources (112) providing additional synchronised shots to achieve a wide-azimuth acquisition. In the embodiment illustrated in FIG. 10a, one of the two acoustic sources being fired from the streamer towing vessel (114) and the other of the two acoustic sources being fired from a gun boat (190) which follows being the streamer towing vessel (114) along the same sinusoidal sail line (116). The use of a second acoustic source is advantageous as it creates acoustic signals that reinforce subsurface features or cancel out noise and other spurious signals. Additional acoustic sources also provide signals from a variety of directions and their use can create information of subsurface formations that would not be detectable if only one acoustic source is used. Generally speaking, gun boats are much cheaper to hire than a vessel that is capable of towing a streamer, so the costs can be contained and additional benefits can be derived at the expense of longer and more complicated signal processing.

Figure 10B:
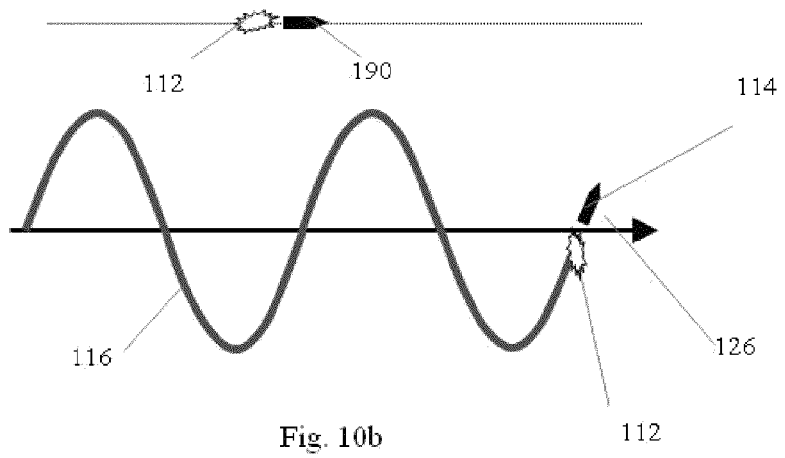
Figure 10C:
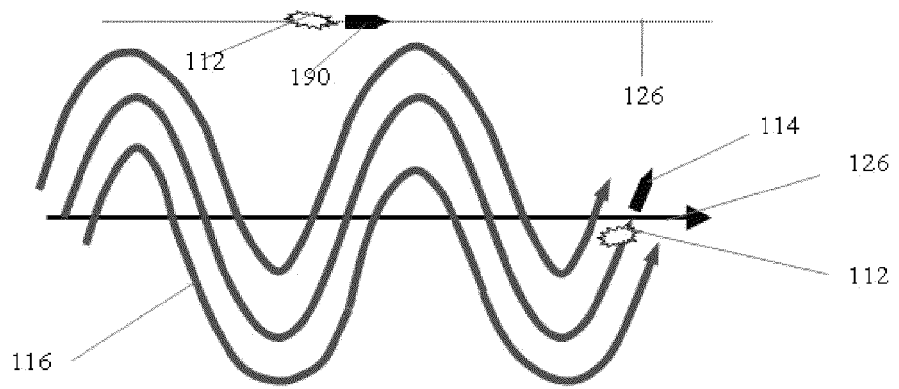

FIG. 10b illustrates an alternative configuration in which at least two acoustic sources (112) are being used to achieve a wide-azimuth acquisition, again using additional synchronised shots. In this embodiment, the gun boat (190) travels along a nominal linear sail line (192) which is parallel to but offset from the center line (126) of the sinusoidal sail line (116) being followed by the streamer-towing vessel (114). The nominal linear sail line (192) being followed by the gunboat (190) may be on either side of the center line (126) of the sinusoidal sail line (116) being followed by the streamer towing vessel (114). When using this configuration, the source vessel (190) is sailed in such a manner as to ensure that the gun boat (190) maintains a safe working distance (of at least 50 meters) from the streamer (120) at all times during the acquisition. FIG. 10c illustrates yet another alternative configuration similar to that illustrated in FIG. 10b using a plurality of streamers (120) to achieve a wide-azimuth acquisition using multiple streamers and multiple sources while the towing vessel (114) follows a sinusoidal sail line (116). In this embodiment, each streamer is separated from each neighbouring streamer by a nominal distance, for example 150 to 400 m to minimize the potential for tangling of the streamer as the vessel (114) turns around at the end of a completed pass to prepare for the next pass across the survey area.

Figure 10D:
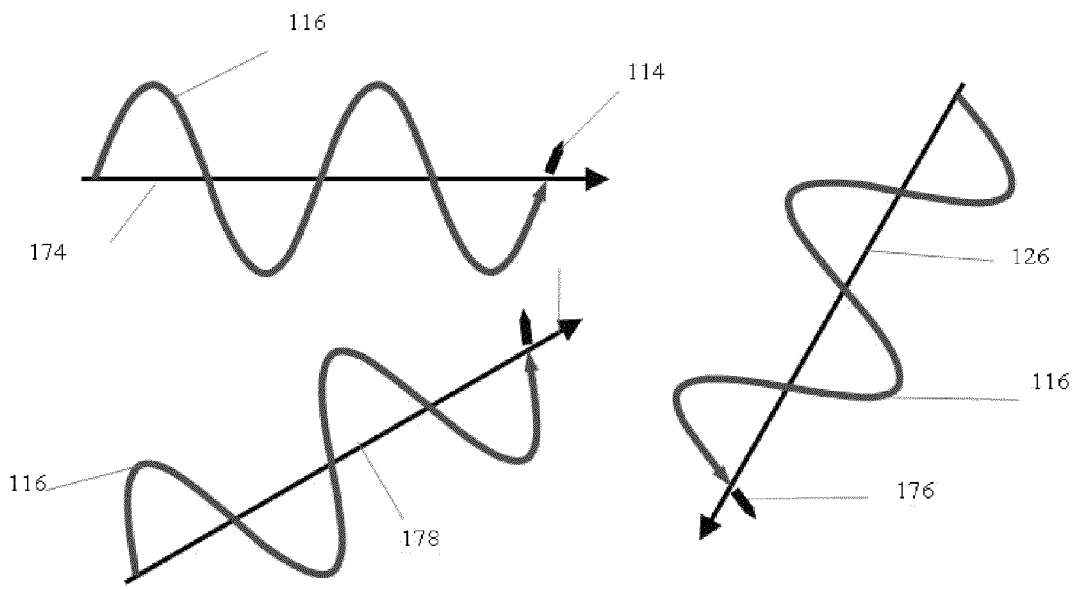
Figure 10E:
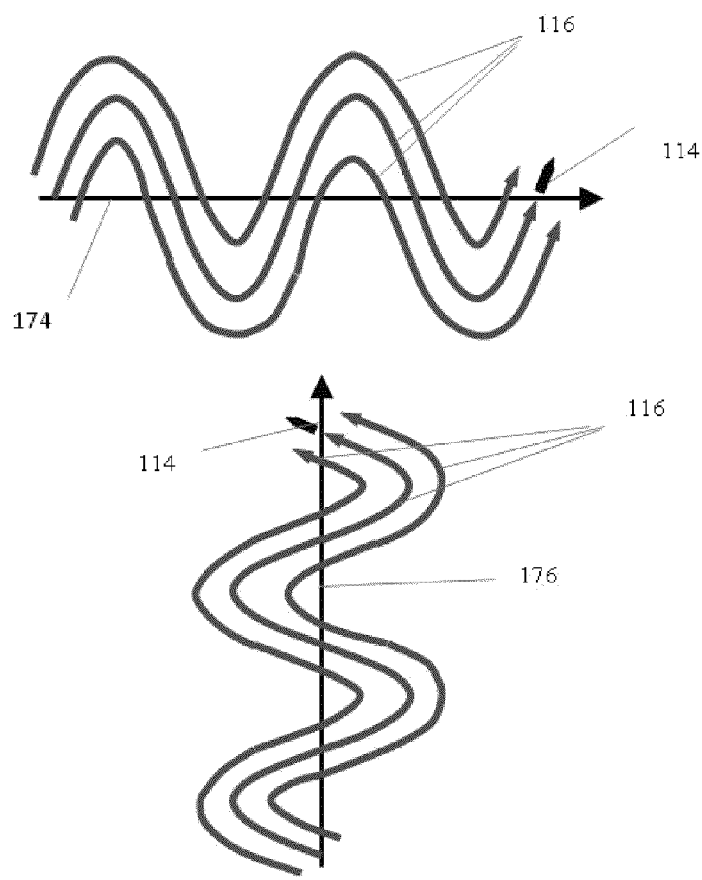

The second or any subsequent pass across the survey area can be acquired with the center line of the sinusoidal sail line being arranged at an angle to the center line of a previous sinusoidal sail line. This angle can be any value but 30, 45, 60 or 90 degrees are preferred for ease of processing. By way of example, three passes can be performed with the center line of each pass being arranged at 60 degrees to the center line of the preceding pass as illustrated in FIG. 10d for a vessel (114) towing a single streamer (120) to achieve a multi-azimuth acquisition. In the embodiment illustrated in FIG. 10e, two passes across the survey area are performed with the center line of each pass being arranged at 90 degrees to the center line of the preceding pass using a vessel (114) towing a plurality of streamers (120) to achieve a rich azimuth acquisition.

A key advantage of the present invention is that a single streamer can be towed (as opposed to the more complex and expensive 3D multi-streamer arrays of the prior art) behind a vessel and the data acquired using the method of the present invention can be used to create a 3-dimensional structural representation of the subsurface formations due to a the offsets having both an in-line component and a cross-line component. When a single streamer is used, less information is collected using the method of the present invention compared with conducting a convention prior art 3D survey but the costs associated with hiring the larger and more expensive vessels required to tow large 3D multi-streamer arrays is avoided. Another distinct advantage is the ability to cover a survey area in a short time thus resulting in a far smaller health, safety and environmental (HSE) imprint. It is however to be understood that a plurality of streamers can be used to acquire seismic data using the process of the present invention instead of using a single streamer, with the benefit of acquiring more data having to be weighed up against the additional cost and noise generated when towing a plurality of streamers.

The method and system of the present invention provides a data set that is more useful than an in-line 2-D survey approach but less complete than a data set acquired conducting a convention 3-D seismic survey. Depending on the particular arrangement selected, the cost of using the marine seismic acquisition method and system of the present invention is comparable to the 2-D seismic survey approach and not as expensive and the time consuming as conducting a 3-D seismic survey. The low fold seismic dataset acquired using the method of present invention is particular useful for large scale reconnaissance purposes.

Figure 11:
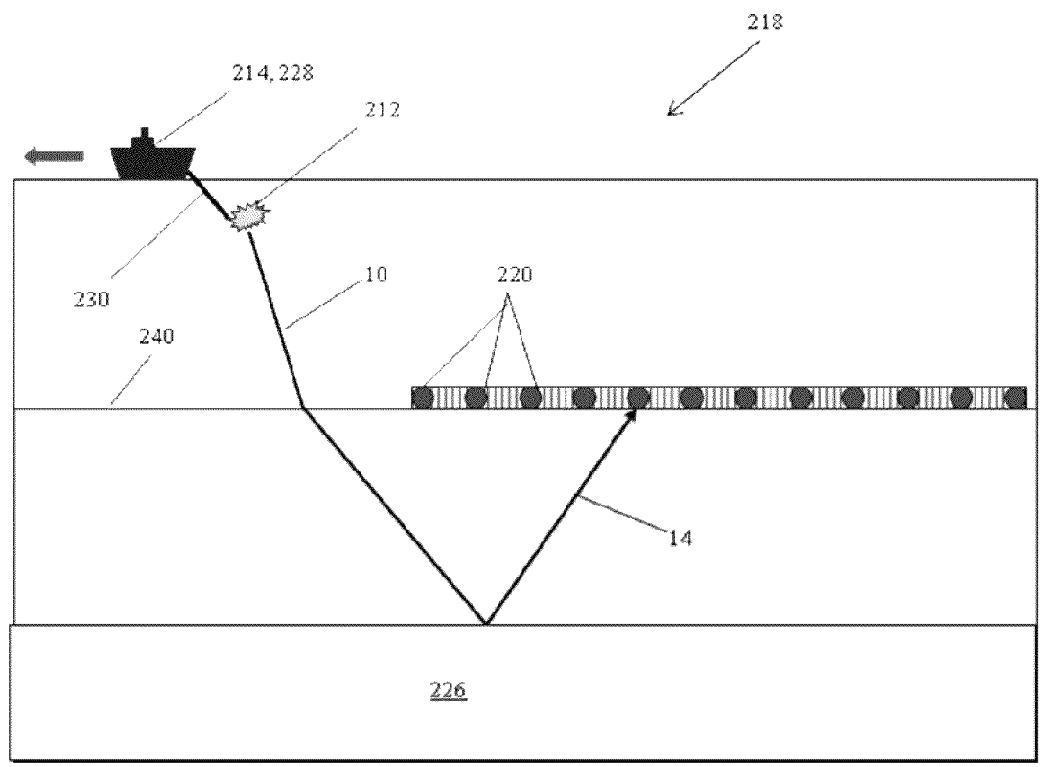
FIG. 11 illustrates schematically a side view of a second embodiment of the present invention in which a signal is transmitted from an acoustic source with the response signal being detected by a plurality of hydrophones arranged in an array on the seabed.
Figure 12:
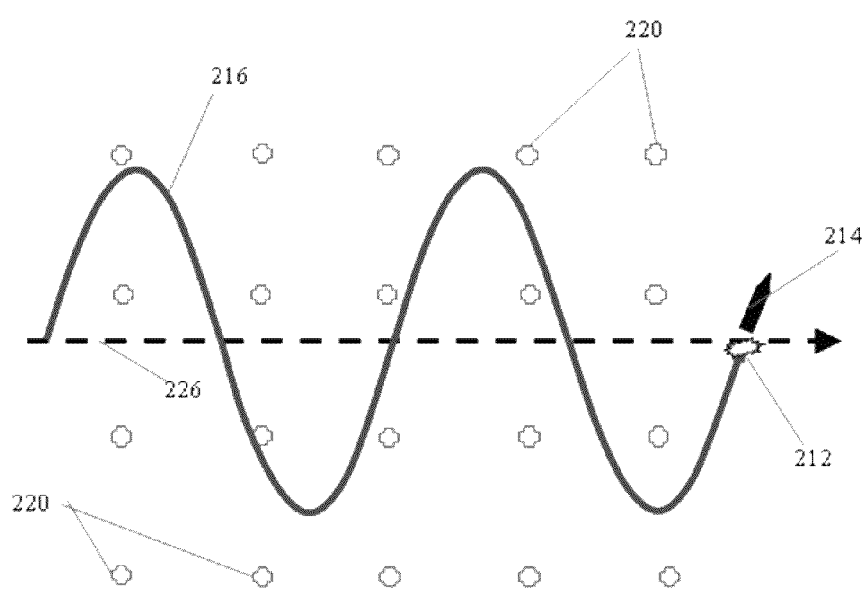
FIG. 12 illustrates schematically a top view of the embodiment illustrated in FIG. 11.

A second embodiment is now described with reference to FIGS. 11 and 12, in which a signal (10) is transmitted from an acoustic source (212). When the acoustic signal is transmitted to a geological structure such as a hydrocarbon bearing reservoir (226), a portion of the signal is reflected from the reservoir in the form of a response signal (14). The response signal (14) is measured at each of a plurality of hydrophones (220) arrayed in the survey area (218) a range of distances from the source (212). With reference to FIGS. 11 and 12, a single acoustic source (212) is towed by a surface vessel (214) along a sinusoidal sail line (216) over a plurality of hydrophones (220) arranged in a spaced apart array, the hydrophones (220) being located on or close to the seabed (240) or the bed of some other area of water. The hydrophones (220) can be fixed to the seabed (240) or be retrievable to allow them to be moved to another location if desired. The acoustic source (212) is attached to the surface vessel (214) by an umbilical cable (230). The umbilical cable provides an electrical, mechanical and optical connection between the acoustic source (220) and the surface vessel (214). Throughout the seismic survey, the orientation and position of the acoustic source (212) relative to the plurality of hydrophones (220) is logged using an instrument package (228) to record the sinuosity of the sinusoidal configuration. A plurality of response signals (14) for a range of source/hydrophone pairs is gathered to provide a seismic survey data set in an analogous manner to that described above for the first embodiment of the present invention. The hydrophones (220) record the response signal as raw data. The raw survey data are then analysed, after recovery of the hydrophones and transfer of the raw data into a suitable computer. The survey data are combined with the logged source and hydrophone orientation and position data.

Figure 13:
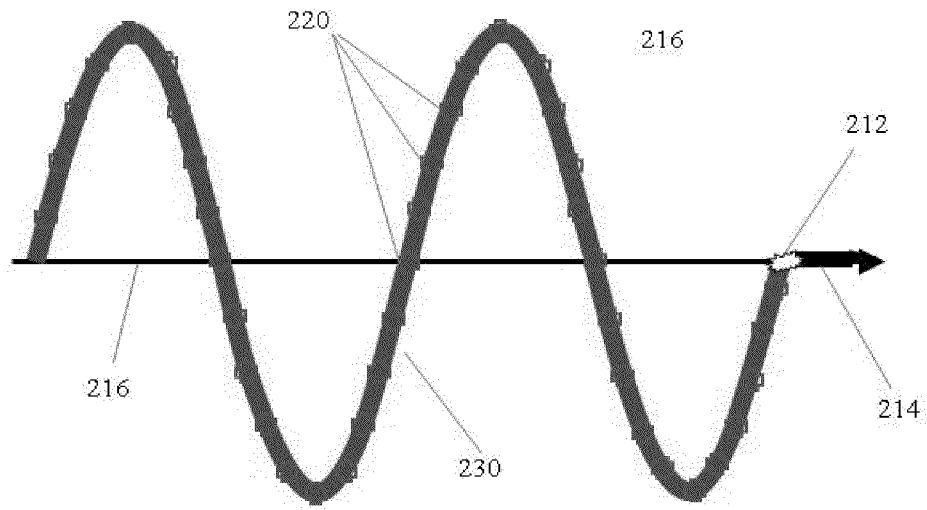
FIG. 13 illustrates schematically a top view of an alternative embodiment of the present invention in which a single acoustic source is used with the plurality of hydrophones being arranged at spaced apart intervals along the length of an ocean-bottom cable; and, FIG. 14 illustrates schematically a top view of an alternative embodiment of the present invention in which the acoustic source is towed along a linear sail line by a surface vessel and the plurality of hydrophones is positioned in a sinusoidal array on the seabed.
Figure 14:
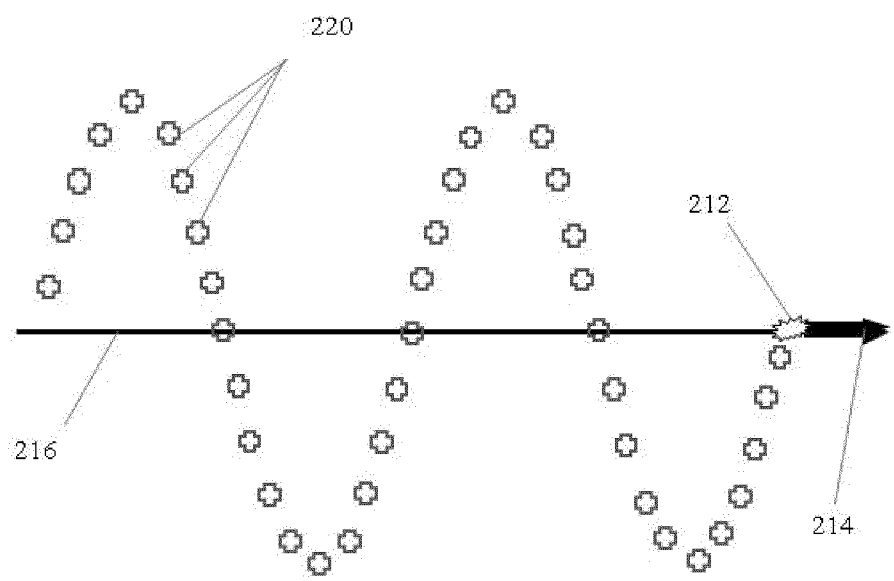

Each of FIGS. 12 to 14 depicts alternative embodiments of seismic surveys according to the present invention. In these embodiments, each surface vessel is shown as symbol (214) and the approximate location of the acoustic source is depicted as symbol (212). The nominal sail line direction per pass (226) is illustrated using dotted and dashed lines with a sinusoidal sail line (216) being illustrated as a solid line with an arrow at one end to indicate the direction of travel of the vessel (214). Clearly, all the configurations illustrated schematically in FIGS. 12 to 14 have different economic costs but it is however an operator decision to choose to use a more expensive towing configuration if the task is completed more quickly or the increased usefulness of the results justifies the cost differential.

The arrangement illustrated in FIG. 12 has already been described above. In the arrangement illustrated in FIG. 13 a single acoustic source (212) is used with the plurality of hydrophones (220) being arranged at spaced apart intervals along the length of an ocean-bottom cable (230) which is laid in the required configuration on the seabed (240). The cable can be moved to another location if desired. The source is towed along a linear sail line (216) by a surface vessel (214) in an analogous manner to that described above for FIGS. 11 and 12. In FIG. 14, the acoustic source (212) is towed along a linear sail line by a surface vessel and the plurality of hydrophones (220) is positioned in a sinusoidal array on the seabed. When the surface vessel has completed a first pass over the survey area, a second or subsequent pass over the survey area can then be conducted in an analogous manner to that described above in relation to the first embodiment of the present invention as described above.

Although only a few embodiments of this invention have been described in detail above, those skilled in the art will readily appreciate that many modifications are possible in the embodiments without materially departing from the novel teachings and advantages of this invention. Alternatively, the ocean-bottom cable can be laid in a sinusoidal configuration while the source vessel sails along a linear sail line as shots are fired from the acoustic source. Accordingly, all such modifications are intended to be included within the scope of this invention.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers. The reference to any prior art in this specification is not, and should not be taken as, an acknowledgment or any form of suggestion that such prior art forms part of the common general knowledge.

What is claimed:

1. A method of acquiring marine seismic data using an acoustic source to generate an acoustic signal, a portion of which is reflected at one or more subsurface formation interfaces as a seismic signal, the method comprising:
   a) sailing a surface vessel along a sinusoidal sail line which lies over an area to be surveyed while towing one or more seismic streamers, each streamer including a plurality of hydrophones to receive the reflected seismic signals, wherein the streamer includes at least two points of inflection as the streamer follows the sinusoidal sail line while seismic data is acquired, and the amplitude of the sinusoidal sail line is in the range of 200 to 1600 meters.

2. The method of acquiring marine seismic data of claim 1, further comprising:
   b) dividing the area to be surveyed using a grid to form a plurality of bins;
   c) collating the seismic signals using the plurality of bins; and
   d) repeating step a) to populate each bin with seismic data, wherein a range of offsets associated with each event varies between adjacent cross-line and in-line bins.

3. The method of acquiring marine seismic data of claim 1, wherein the amplitude of the sinusoidal sail line is in the range of 800 to 1600 meters.

4. The method of acquiring marine seismic data of claim 1, wherein the amplitude of the sinusoidal sail line is in the range of 400 to 1200 meters.

5. The method of acquiring marine seismic data of claim 1, wherein one or both of the wavelength and frequency of the sinusoidal sail line is uniform during each pass over the survey area.

6. The method of acquiring marine seismic data of claim 2, wherein steps a) is conducted as a surface vessel completes a first pass over the survey area, and steps a) to d) are repeated as the surface vessel completes a second or subsequent pass over a survey area.

7. The method of acquiring marine seismic data of claim 6, wherein the second pass and any subsequent pass is staggered from the first pass or a previous pass along the length of the survey area by a distance equal to the amplitude of the sinusoidal configuration of the first pass or a previous pass.

8. The method of acquiring marine seismic data of claim 6, wherein the second pass and each subsequent pass is staggered from the first pass or a previous pass across the width of the survey area by one quarter of the wavelength of the sinusoidal configuration.

9. The method of acquiring marine seismic data of claim 6, wherein the second and any subsequent pass across the survey area is acquired with the center line of the sinusoidal sail line being arranged at an angle to the center line of a previous sinusoidal sail line.

10. The method of acquiring marine seismic data of claim 9, wherein the angle is selected from the group consisting of 30, 45, 60 and 90 degrees.

11. The method of acquiring marine seismic data of claim 9, wherein at least three passes across the survey area are performed with the center line of each pass being arranged at 60 degrees to the center line of a preceding pass.

12. The method of acquiring marine seismic data of claim 9, wherein at least two passes across the survey area are performed with the center line of each pass being arranged at 90 degrees to the center line of a preceding pass.

13. The method of acquiring marine seismic data of claim 1, wherein the source is one of a plurality of sources, and wherein one of the plurality of sources transmits a signal from a surface vessel travelling along a nominal linear sail line, and another of the plurality of sources transmits a signal from a surface vessel travelling along a sinusoidal sail line.

14. The method of acquiring marine seismic data of claim 1, wherein the geological feature is suitable for bearing hydrocarbons.

15. The method of acquiring marine seismic data of claim 1, wherein the streamer is one of a plurality of streamers being towed along a sinusoidal sail line by a surface vessel, and each streamer is separated from each neighbouring streamer by a distance in the range of 150 to 400m.

16. A method of undertaking a seismic survey over a geological structure within a survey area, the method comprising the steps of:
   a) transmitting an acoustic source signal from a source;
   b) measuring a response signal at each of a plurality of hydrophones arrayed in the survey area, the response signal being indicative of an interaction between the source signal and the geological structure;
   c) logging the orientation and position of the source relative to the plurality of hydrophones; and
   d) gathering a plurality of response signals for a range of source/hydrophone pairs to provide a survey data set, wherein the source and the plurality of hydrophones are arranged in a sinusoidal configuration relative to a nominal linear sail line, the survey data set includes adjacent cross-line bins of data and adjacent in-line bins of data, each data bin includes a partial range of recorded offset data in relation to a potential full range of offset data available to each data bin, and the partial range within which offset data is recorded is different in each set of adjacent cross-line bins and adjacent in-line bins such that the survey data set includes a variable offset range in both the in-line and cross-line directions.

17. The method of undertaking a survey according to claim 16, wherein the amplitude of the sinusoidal configuration is uniform during each pass over the survey area.

18. The method of undertaking a survey according to claim 16, wherein the amplitude of the sinusoidal configuration is in the range of 200 to 1600 meters.

19. The method of undertaking a survey according to claim 16, wherein the amplitude of the sinusoidal configuration is in the range of 800 to 1600 meters.

20. The method of undertaking a survey according to claim 16, wherein the amplitude of the sinusoidal configuration is in the range of 400 to 1200 meters.

21. The method of undertaking a survey according to claim 16, wherein one or both of the wavelength and frequency of the sinusoidal configuration is uniform during each pass over the survey area.

22. The method of undertaking a survey according to claim 16, wherein the source is located at or below the surface of a body of water, and the plurality of hydrophones are located on or close to the seabed or the bed of some other body of water.

23. The method of undertaking a survey according to claim 16, wherein steps a) to d) are conducted as a surface vessel completes a first pass over the survey area, and steps a) to d) are repeated as the surface vessel completes a second or subsequent pass over the survey area.

24. The method of undertaking a survey according to claim 16, wherein the second pass and any subsequent pass is staggered from the first pass or a previous pass along the length of the survey area by a distance equal to the amplitude of the sinusoidal configuration of the first pass or a previous pass.

25. The method of undertaking a survey according to claim 16, wherein the second pass and each subsequent pass is staggered from the first pass or a previous pass across the width of the survey area by one quarter of the wavelength of the sinusoidal configuration.

26. The method of undertaking a survey according to claim 16, wherein the second and any subsequent pass across the survey area is acquired with the center line of the sinusoidal sail line being arranged at an angle to the center line of a previous sinusoidal sail line.

27. The method of undertaking a survey according to claim 26, wherein the angle is selected from the group consisting of 30, 45, 60 and 90 degrees.

28. The method of undertaking a survey according to claim 26, wherein at least three passes across the survey area are performed with the center line of each pass being arranged at 60 degrees to the center line of a preceding pass.

29. The method of undertaking a survey according to claim 26, wherein at least two passes across the survey area are performed with the center line of each pass being arranged at 90 degrees to the center line of a preceding pass.

30. The method of undertaking a survey according to claim 16, wherein the source is one of a plurality of sources, and one of the plurality of sources transmits a signal from a surface vessel travelling along a nominal linear sail line and another of the plurality of sources transmits a signal from a surface vessel travelling along a sinusoidal sail line.

31. The method of undertaking a survey according to claim 16, wherein the streamer is one of a plurality of streamers being towed along a sinusoidal sail line by a surface vessel, and each streamer is separated from each neighbouring streamer by a distance in the range of 150 to 400m.

32. A method of planning a survey of an area that is thought or known to contain a subterranean hydrocarbon bearing reservoir, comprising:
   creating a model of the area to be surveyed including a seafloor, a rock formation containing a postulated hydrocarbon bearing reservoir beneath the seafloor, and a body of water above the seafloor;
   setting values for depth below the seafloor of the postulated hydrocarbon reservoir and material properties of the geological structure; and
   performing a simulation of steps a) to d) of claim 16.

33. A survey data acquisition system comprising:
   a source configured to transmit a source signal;
   a plurality of hydrophones arrayed in the survey area to measure a response signal at each hydrophone, the response signal being indicative of an interaction between the source signal and the geological structure;
   means for logging the orientation and position of the source relative to the plurality of hydrophones; and
   means for gathering a plurality of response signals for a range of source/hydrophone pairs to provide a survey data set;
   wherein the source and the plurality of hydrophones are arranged in a sinusoidal configuration relative to a nominal linear sail line, the survey data set includes adjacent cross-line bins of data and adjacent in-line bins of data, each data bin includes a partial range of recorded offset data in relation to a potential full range of offset data available to each data bin, and the partial range within which offset data is recorded is different in each set of adjacent cross-line bins and adjacent in-line bins such that the survey data set includes a variable offset range in both the in-line and cross-line directions.

34. A method of storing and utilizing marine survey data comprising:
   obtaining a survey data set using the method of claim 1; and
   analyzing the survey data set to obtain information relating to a geological structure underlying a body of water.

* * * * *